United States Patent
Miyamoto (10) Patent No.: US 7,991,212 B2
(45) Date of Patent: Aug. 2, 2011

(54) IMAGE PROCESSING APPARATUS, IMAGE PROCESSING METHOD, AND COMPUTER PROGRAM

(75) Inventor: Hideaki Miyamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 12/351,094

(22) Filed: Jan. 9, 2009

(65) Prior Publication Data

US 2009/0175528 A1 Jul. 9, 2009

(30) Foreign Application Priority Data

Jan. 9, 2008 (JP) ................ 2008-002614

(51) Int. Cl.
*G06K 9/00* (2006.01)
(52) U.S. Cl. ............................................. 382/132
(58) Field of Classification Search .......... 382/132, 382/128, 130, 100, 276, 266, 274, 282, 283; 250/574, 582, 583, 584
See application file for complete search history.

(56) References Cited

U.S. PATENT DOCUMENTS

| | | | |
|---|---|---|---|
| 4,847,498 A * | 7/1989 | Saito et al. ............. | 250/585 |
| 4,967,079 A | 10/1990 | Shimura | |
| 4,995,093 A * | 2/1991 | Funahashi et al. ........... | 382/132 |
| 5,028,781 A * | 7/1991 | Shimura et al. ............. | 250/583 |
| 6,356,651 B2 | 3/2002 | Murakami | |
| 6,501,829 B2 * | 12/2002 | Matsumoto et al. .......... | 378/154 |
| 7,418,122 B2 | 8/2008 | Matsuura | |

FOREIGN PATENT DOCUMENTS

| | | |
|---|---|---|
| JP | 63-259538 | 10/1988 |
| JP | 10-275213 | 10/1998 |
| JP | 2005-261596 | 9/2005 |
| JP | 2006-254934 | 9/2006 |

* cited by examiner

*Primary Examiner* — Yon Couso
(74) *Attorney, Agent, or Firm* — Cowan, Liebowitz & Latman, P.C.

(57) ABSTRACT

An image processing apparatus is provided. The apparatus includes a setting unit configured to set a radiation exposure condition; a radiation generation unit configured to generate a radiation beam according to the radiation exposure condition; a two-dimensional radiation sensor configured to transform the reached radiation beam into a radiation image data and output the radiation image data; a storage unit configured to store the radiation image data; a detecting unit configured to detect a scattered radiation fluctuation in the reached radiation beam based on a comparison of two radiation image data with different radiation exposure condition, where the two radiation image data are selected within the plurality of radiation image data stored in the storage unit; and an image processing unit configured to extract a outline of a region of interest from the radiation image data based on the scattered radiation fluctuation detected by the detecting unit.

11 Claims, 8 Drawing Sheets

REACHABLE VOLUME/RENGE FLUCTUATION OF
SCATTERED RADIATION IN OUTER EXPOSURE FIELD REGION

IMAGE PROCESSING APPARATUS, IMAGE PROCESSING METHOD, AND COMPUTER PROGRAM

BACKGROUND OF THE INVENTION

1. Field of the Invention

The present invention relates to an image processing apparatus, image processing method thereof, and a computer program.

2. Description of the Related Art

Digital processing of medical radiation fluoroscopic images has become common due to recent advancements in digital technology. Especially, conventional radiation diagnosis, which uses film for radiation photographing, has replaced with newly developed two-dimensional radiation sensor technology that allows outputting radiation images as digital data. When such sensors are used in radiation fluoroscopy apparatus, digital imaging processes such as tone processing for improving visibility of radiation images has become an essential technology.

Also, Auto Exposure Control (AEC) is conducted in radiation fluoroscopy, which used for detecting X-ray dosage transmitted by an object and controlling X-ray dosage without an excess or deficiency.

In both image processing and exposure controlling as mentioned above, the degree of processing conducted on the region of interest regarding the diagnosis, is decided based on values that represent the feature level (feature amounts). As an example, in tone processing, maximum density value and minimum density value of the pixel within the region of interest of the radiation image is calculated, then the maximum density value and minimum density value is controlled so that brightness of the monitor output is within the upper and lower bounds. Transforming the image based on the output as above is called output transformation.

In addition, Auto Exposure Control (AEC) extracts feature amounts such as average value from the region of interest of radiation fluoroscopic image created by radiation exposure by the radiation generator. Then, the next X-ray exposure condition (tube voltage, tube current, pulse width, etc. of the radiation generator) is controlled based on comparison of the feature amount with a reference value.

It is necessary to select the area of interest used for compute feature amount of the radiation image to conduct adequate image processing and auto exposure control.

However, in general radiation fluoroscopy, exposed X-ray dosage is controlled by exposure field aperture attached to radiation generator by controlling radiation exposure-field region for reducing the influence of radiation decrease and scattered radiation. When such controlling is conducted, the region on the radiation image, outside of opening of the exposure field aperture (hereinafter: outer exposure field region) does not contain effective object information. Because this region does not contain information obtain from radiation directly pass through the object; it only contain the information obtained from scattered radiations entered the sensor.

In addition, when radiopaque objects such as artificial tooth root (dental implantations), and heart phase maker exist in the photographed human body, image density value differs significantly on the radiation image from the interested photographed body area.

When the region of interest for feature calculation includes outer exposure field regions and regions corresponding to radiopaue objects, feature amounts that should show the features of object region with diagnostic interest get influenced by the regions that do not contain valid information in regards to the diagnostic. This become a hindrance for appropriate image processing and auto exposure control (AEC). To overcome this problem, methods (for exposure field recognition process, object recognition process) that can clear off outer exposure field region and radiopaque object region from the region of interest and then recognize the required region, have been proposed.

As an example, in Japanese Patent Laid-Open No. 63-259538, proposes a recognition process of exposure field by utilizing steep change of image density value between the border (outline of exposure field) of exposure field region and outer exposure field region. In this method, the image is scanned from a predetermined point (as a example the center point of the image) assumed to be within exposure-field region of the image, on a straight line while advancing towards the end of the image. When the difference value of a pixel scanned on the straight line is over a predetermined threshold value, the element is set as the slate point on an outline of exposure field. Then, slate points marked by neighboring lines are connected and considered as the outline of exposure field, and inside of the outline is defined as exposure field region and outside of the outline is defined as the outer exposure field region.

Moreover, in Japanese Patent Laid-Open No. 10-275213, instead of selecting slate points on outline of the exposure field using the method by Japanese Patent Laid-Open No. 63-259538, straight line scanning based on Hough transform is used to increase the detection precision of exposure field region.

In addition, in Japanese Patent Laid-Open No. 2006-254934 proposed a method, to prevent the error may occurred in X-ray exposure unit while extracting the border in method described in Japanese Patent Laid-Open Nos. 10-275213 and 63-259538, first the image is partitioned using the straight lines which creates the slate points on outline of exposure field and then the image-intensity is evaluated in partitioned image parts to detect the exposure field region.

As a method that clears off the radiopaque object region, Japanese Patent Laid-Open No. 2006-254934 is proposed an object recognition method using region growing algorithm. In this method, the initial region is selected by analyzing the object region, after deleting outer exposure field region and direct irradiation region that directly arrived to the sensor without passing the object. From this initial region, based on difference value of adjacent pixels initial region expanded while detecting radiopaque object region, and manage to separate object region and radiopaque object as a result.

In the methods discussed above various parameters are needed for calculations. Such as threshold value needed decide outline of exposure field, threshold value necessary for detecting straight lines in Hough transformation, parameters necessary for deciding likeness of exposure field region or image partitioning and growing conditions which differ according to the image processing state can be given as some of these parameters.

In general, image-processing methods that separate the region necessary and the region unnecessary are constructed with multiple algorithms to increase the detection precision. For this reason, the processing time increase is considered as a problem. Moreover, processes require large number of parameters, and tuning these parameters accordingly is also considered as a problem.

Thus, in present invention, an exposure field region and object region recognition technique with short processing time and easy parameter tunings is proposed.

SUMMARY OF THE INVENTION

According to one aspect of the present invention, an image processing apparatus comprises a setting unit configured to set a radiation exposure condition; a radiation generation unit configured to generate a radiation beam according to the radiation exposure condition; a two-dimensional radiation sensor configured to transform the reached radiation beam into a radiation image data and output the radiation image data; a storage unit configured to store the radiation image data; a detecting unit configured to detect a scattered radiation fluctuation in the reached radiation beam based on a comparison of two radiation image data with different radiation exposure condition, where the two radiation image data are selected within the plurality of radiation image data stored in the storage unit; and an image processing unit configured to extract a outline of a region of interest from the radiation image data based on the scattered radiation fluctuation detected by the detecting unit.

According to another aspect of the present invention, an information processing method comprises steps of: setting a radiation exposure condition by a setting unit; generating a radiation beam according to the radiation exposure condition by a radiation generating unit; transforming the reached radiation beam into a radiation image data and output the radiation image data by a two-dimensional sensor; storing the radiation image data on a storage unit; detecting a scattered radiation fluctuation in the reached radiation beam based on a comparison of two radiation image data with different radiation exposure condition, where the two radiation image data are selected within the plurality of radiation image data stored in the storage unit; and extracting a outline of a region of interest from the radiation image data based on the scattered radiation fluctuation detected at the detecting.

Further features of the present invention will become apparent from the following description of exemplary embodiments (with reference to the attached drawings).

DESCRIPTION OF THE EMBODIMENTS

The preferred embodiments of the present invention will be described in detail below with reference to the accompanying drawings.

The First Embodiment

Figure 1:
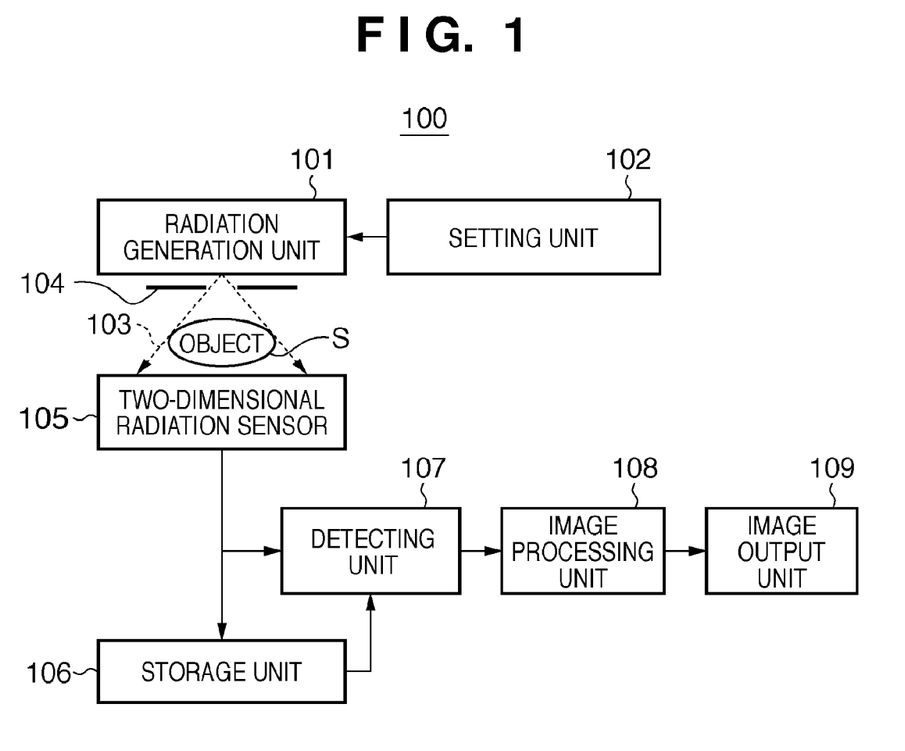
FIG. 1 is a block diagram according to the first embodiment of the present invention.

The first embodiment according to the present invention, as an example, is applied to the radiation imaging apparatus 100 as show in block diagram in FIG. 1. FIG. 1 is an example of a system block diagram according to first embodiment.

In radiation imaging apparatus 100, radiation generation unit 101 generates radiation beam 103 towards the object S according to the conditions set by setting unit 102. Irradiation coverage of radiation beam 103 is controlled in order to only allow radiation to pass through the region of interest of the object S using the exposure-field aperture 104 installed into radiation generation unit 101. The two-dimensional radiation sensor 105 output the reached radiation beam 103 as a radiation image data I.

Figure 2:
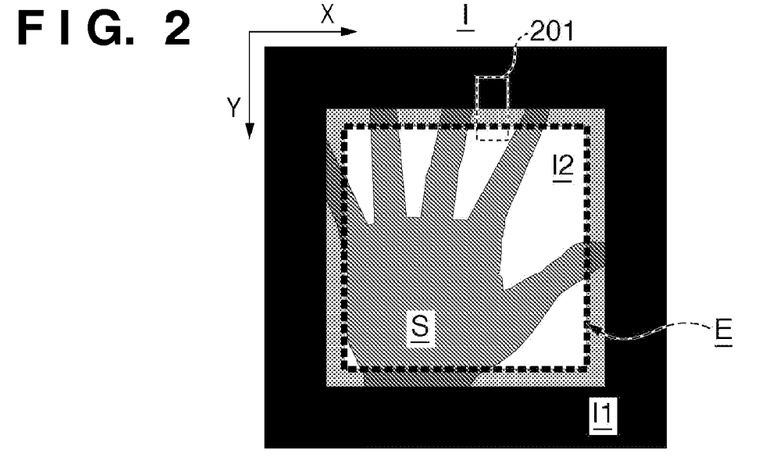
FIG. 2 shows an example of an image that undergoes image processing according to present invention.

As shown in FIG. 2, the radiation image data I comprise with outer-exposure-field region I1 and exposure-field region I2. FIG. 2 represents one example of an image that undergoes image processing according to the current invention. In FIG. 2, outline of exposure field E represented in a dotted line, corresponds to outline of the opening of exposure-field aperture 104, has the same shape as outline of opening and is the edge line where image intensity changes rapidly. For the sake of below discussion, a coordinate system is defined where the left top corner is set as origin, x axis towards right, and y axis towards bottom along image boundaries. However, the coordinate system is not limited to the above-defined coordinate system. Moreover, in radiation image data I, outer-exposure-field region I1, the region outside of the outline of exposure field E correspond to region outside of outline of opening of the exposure field aperture 104. Because of the radiation beam 103 passing object S is blocked by exposure field aperture 104, the beams do not reach the outer exposure field region I1 directly.

On the other hand, the exposure field region I2 of radiation image data I that positioned within the outline of exposure field E, corresponds to the region within outline of opening of exposure field aperture 104. The radiation beam 103 directly pass the object S, which is called primary radiation, and reach the two-dimensional radiation sensor 105 creates image density differences which are relevant for diagnosis within exposure field region I2. These image density differences create the object image.

Figure 3:
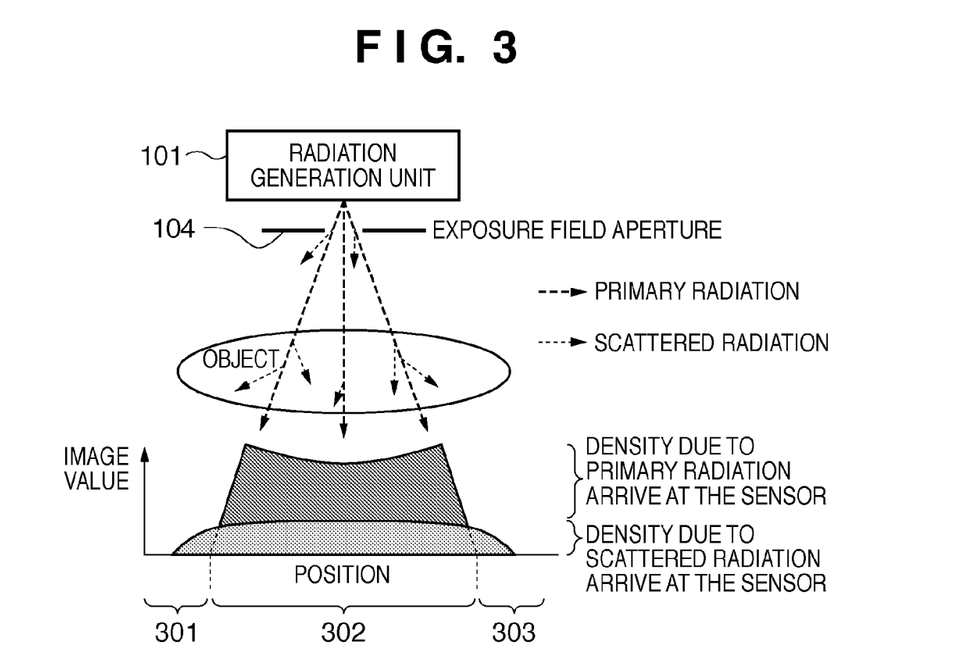
FIG. 3 shows an example of primary radiation and scattered radiation formed in exposure field region/outer exposure field region.

However, as shown in FIG. 3, when beams pass the object S and outer opening of exposure field aperture 104, scattered radiation is created due to cross interactions. FIG. 3 shows an example of primary beams and scattered beams that construct exposure field region and outer exposure field region. The region represented by 301 and 303 corresponds to outer exposure field region I1. Moreover, the region represented by 302 corresponds to exposure field region I2.

Scattered radiation falls into the region outside of outline of opening of the exposure-field aperture 104, and reach the two-dimensional radiation sensor 105. Due to this reason, in outer exposure field region I1 subtle image density differences has been created even though it should have a 0 image density value in ideal situation. However, outer exposure field region I1 does not contain meaningful object image information that can be used for diagnosis. Image density value in exposure field region I2 created by radiation reached the two-dimensional radiation sensor 105 adds up the scattered radiation created image density value and primary radiation created image density value. Because outer exposure field region I1 does not receive any primary radiation, the image density value of outer exposure field region I1 is smaller than the image density value of exposure field region I2.

According to present invention the outline of the region of interest is the outline of exposure field, in case the photographed object contain a radiopaque object, the outline of aforementioned radiopaque object on the two-dimensional radiation sensor (which is called radiopaque object outline) is also included. Moreover, region of interest is the exposure field region. However, in case the photographed object contains a radiopaque object, the region after clearing off the region belongs to radiopaque from exposure field region is conceded as region of interest.

Again example of a radiation imaging apparatus 100 construction is explained using FIG. 1. In addition to the elements represented earlier the radiation imaging apparatus 100 further contains, a storage unit 106 that stores radiation image data output by the two-dimensional radiation sensor 105, detecting unit 107, image processing unit 108 and image output unit 109. Detecting unit 107 detects fluctuation of scattered radiation using multiple radiation image data. Image processing unit 108 extracts the exposure field region I2 from radiation image data I by clearing out outer exposure field region I1 based on fluctuation of scattered radiation. Then image processing unit 108 calculates the feature amounts using the extracted exposure-field region, by using the feature amounts tone transformation is conducted on the exposure field region I2 and create the output image Iout. Image output unit 109 conducts functions such as outputting image to a monitor and printing to a film.

Figure 6:
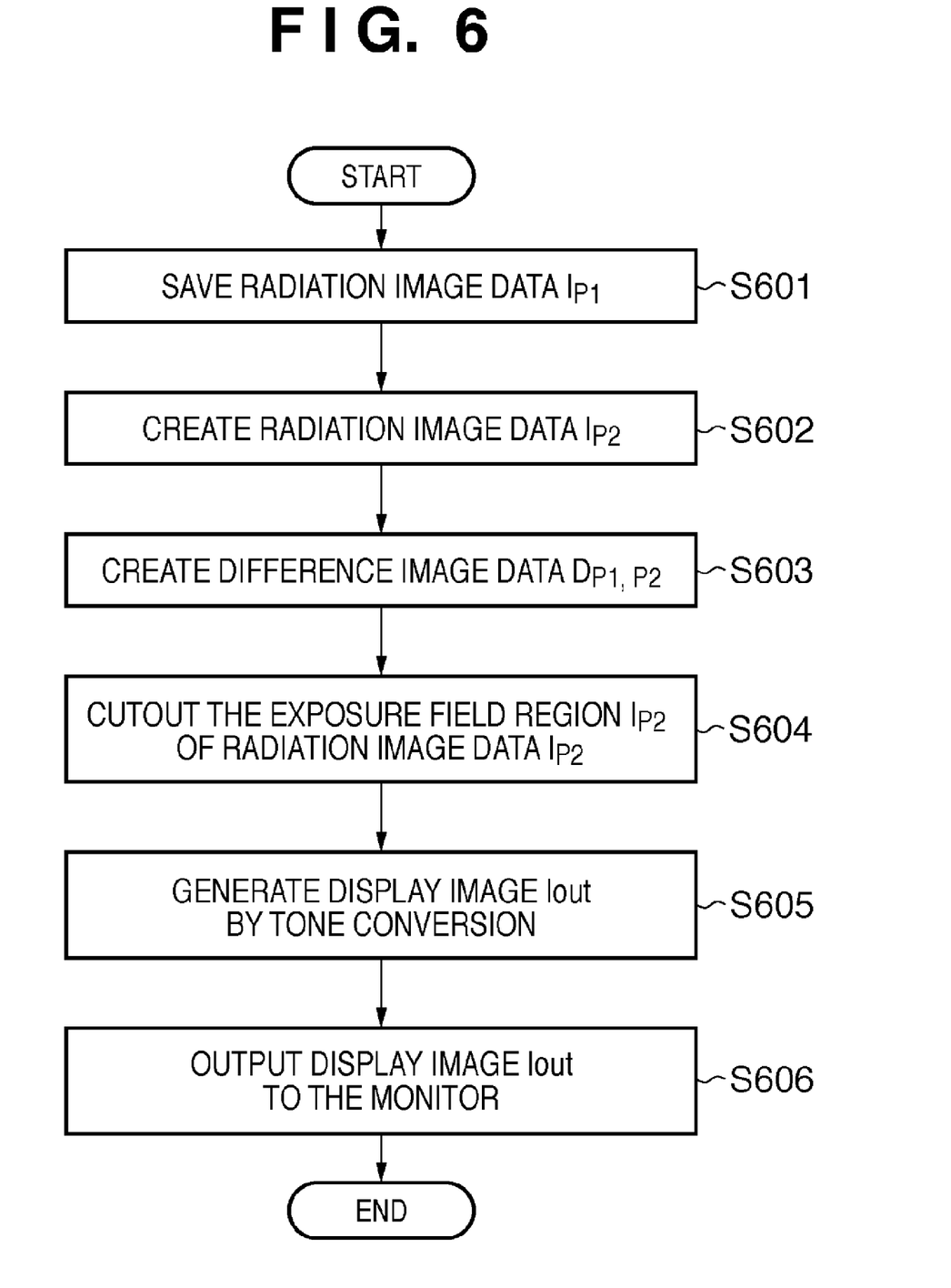
FIG. 6 is a flowchart showing an example of operations of image processing apparatus according to first embodiment.

As a example of above process, extracting exposure field region I2 from radiation image data I, calculating feature amounts from extracted exposure-field region I2 and conducting tone transformations in radiation image I is explained using the flowchart of FIG. 6. FIG. 6 is a flow chart showing an example of process flow of image processing conducted according to the first embodiment of the present invention. In step S601, radiation generation unit 101 generates the radiation beam 103 towards object S according to the radiation exposure conditions P1 of setting unit 102.

This radiation exposure condition P1 is expected to be set such that the object get exposed to radiation level less than the adequate radiation level need to create the radiation image necessary for diagnosis. As ways of decreasing the radiation level, decreasing tube voltage, tube current or shorten the time interval of exposure can be given. In addition, even in case the radiation level is higher than the adequate radiation level, the effects of the present invention can be obtained. The radiation beam 103, directed to object S by exposure field aperture 104, pass though it while attenuating, and reach the two-dimensional radiation sensor 105. The two-dimensional radiation sensor 105 transform the received radiation beam 103 to radiation image data $I_{p1}$ and output to the storage unit 106 where it get saved.

At the next step S602, radiation generation unit 101 generates a radiation beam 103 towards object S based on radiation exposure condition P2, which differ from radiation condition P1 received from setting unit 102. This radiation exposure condition P2 creates adequate radiation exposure for creating radiation image of object information for diagnosis by controlling tube voltage, tube current and exposure time. In present invention, the explanation is conduct considering the case where tube voltage is higher for radiation exposure condition P2 than the tube voltage for radiation exposure condition P1. Additionally, in present embodiment it is considered the second radiation exposure condition generates adequate radiation level and the first radiation exposure has a smaller radiation level than the second one, however it is possible to set the first radiation exposure condition to create adequate radiation exposure level and the second radiation exposure condition to have a radiation level smaller than the first condition.

The radiation beam 103, directed to object S by exposure field aperture 104, pass though the object while attenuating, and reach the two-dimensional radiation sensor 105. The two-dimensional radiation sensor 105 transforms the received radiation beam 103 to radiation image data $I_{p2}$ and output it.

Due to differences in radiation exposure condition P1 and P2, the radiation image data $I_{p1}$ and $I_{p2}$ created at the above step S601 and step S602 has differences in overall radiation image density value and contrast. Also these two cases have difference in reachable volume and reachable range of scattered radiation that fell outside of the outline of opening of exposure field.

Figure 4:
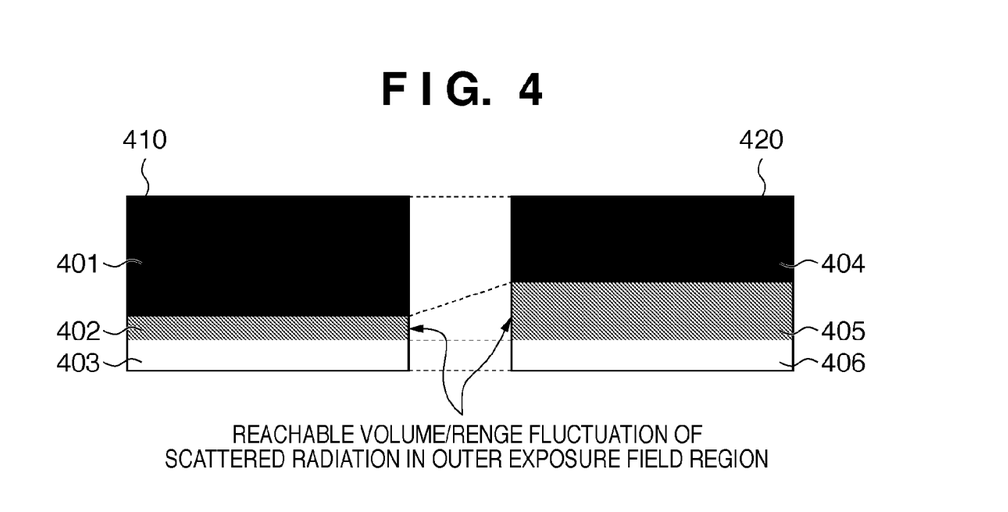
FIG. 4 shows an example of fluctuations occurred in outline of exposure field in radiation image data when different radiation exposure conditions were used for imaging.

The fluctuation of image density value occurred due to reachable volume and reachable range of scattered radiation around the region of outline of exposure field is explained using FIG. 4. FIG. 4 represent an example of fluctuation occurred in outline of exposure field of different radiation image data when different radiation exposure conditions were used for shooting.

Image data 410 and image data 420 represents a part of radiation image data captured under different radiation exposure conditions. This part is an example that corresponds to region 201 shown in FIG. 2. According to present embodiment, the image data 410 and image data 420 corresponds to radiation image data $I_{p1}$ and $I_{p2}$ captured under radiation exposure condition P1 and P2 respectively. Region 403 and region 406 are parts of exposure-field region $I1_{p1}$ and $I1_{p2}$, which belong to radiation image data $I_{p1}$ and $I_{p2}$ respectively. On the other hand, region 401 and region 404 are parts of outer exposure field region $I2_{p1}$ and $I2_{p2}$, which belong to radiation image data $I_{p1}$ and $I_{p2}$ respectively. Region 402 and region 405 are part of reachable regions of scattered radiation in outer exposure field region $I2_{p1}$ and $I2_{p2}$ respectively.

In present embodiment, because tube voltage is set to high value under radiation exposure condition P2 compared to radiation exposure condition P1, radiation image data $I_{p2}$ has a higher image density value compared to radiation image data $I_{p1}$. Further, reachable volume and reachable range of scattered radiation in outer exposure field region has become bigger. As shown in the example in FIG. 4, region 405 is a wider region compared to region 402.

Based on above characteristics, a method to extract outline of exposure field using reachable volume of scattered radiation and fluctuation is discussed while returning to FIG. 6.

In step S603, detection unit 107 detects the fluctuation in reached scattered radiation between radiation image data $I_{p1}$ and $I_{p2}$. As denoted above, radiation image $I_{p2}$ has a higher image density value and bigger reachable region in outer exposure field region $I1_{p2}$ compared to radiation data $I_{p1}$. To detect total fluctuation of image density value between radiation image data $I_{p1}$ and $I_{p2}$ created by reached scattered radiation, outer exposure field region I1 that does not receive primary radiation and has lower image density value is used. Specifically, as shown in equation 1, the detection unit 107 calculates the logarithmic value of radiation image data $I_{p1}$ and $I_{p2}$ and then evaluates the difference between the two values to obtain the difference image $D_{P1,P2}$.

$$D_{P1,P2}(x,y) = \log(I_{p1}(x,y)) - \log(I_{p2}(x,y)) \qquad \text{(Equation 1)}$$

In above equation, $D_{P1,P2}(x, y)$ represents the image density value of coordinate (x, y) of difference image $D_{P1,P2}$, $I_{P1}(x, y)$ represents the image density value at coordinate (x, y) of radiation image data $I_{P1}$, and $I_{P2}(x, y)$ represents the image density value at coordinate (x, y) of radiation image data $I_{P2}$. Additionally, the FIG. 5 has the same coordinate system as in the FIG. 2. The usage of logarithmic values allows emphasizing the difference in image density value of lower density region.

Figure 5:
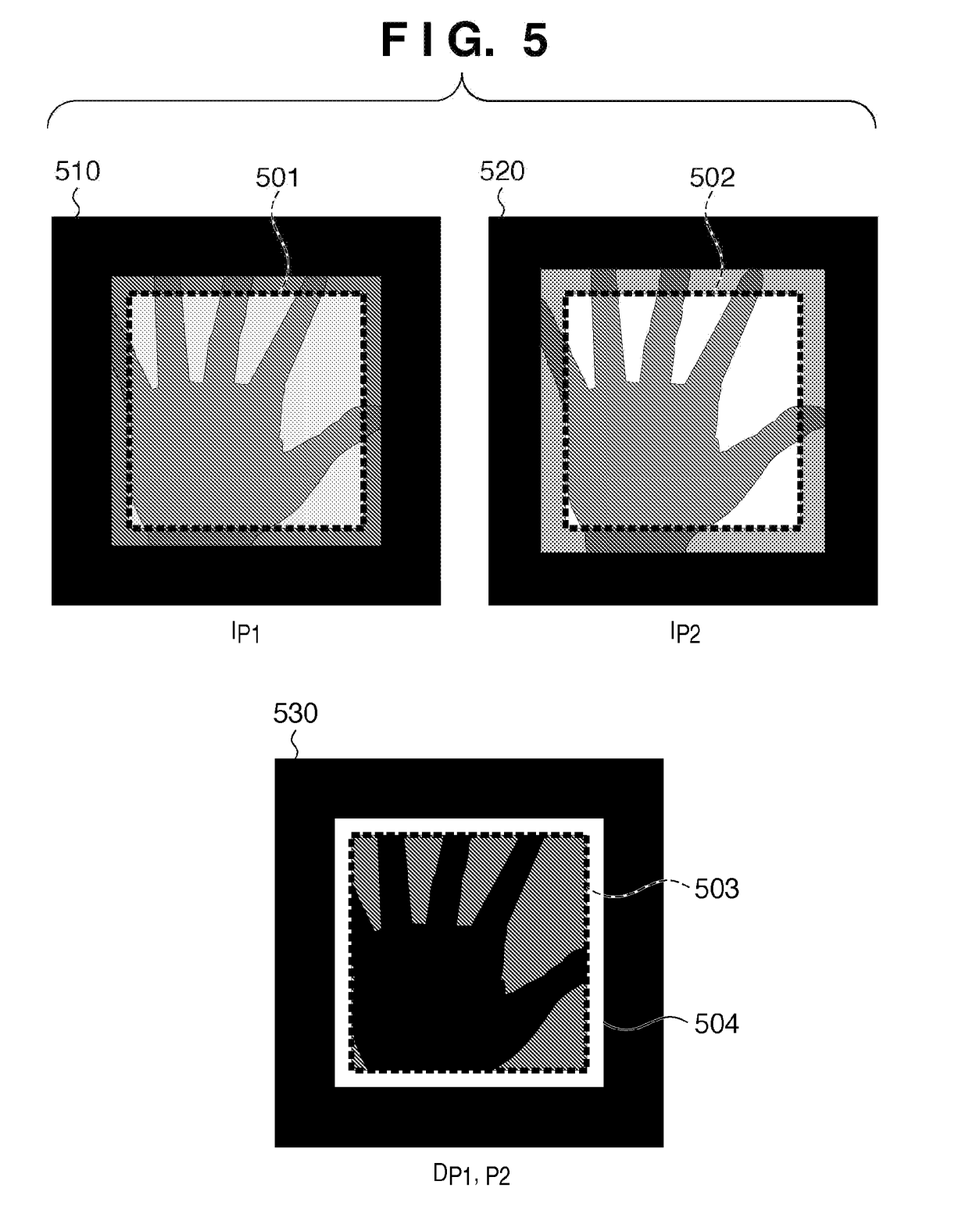
FIG. 5 shows an example of images where different radiation exposure conditions were used for shooting and their difference image.

The formation of difference image is explained using the FIG. 5. FIG. 5 shows an example of images where different radiation exposure conditions were used for shooting and their difference image. Image data 510 and image data 520 are radiation image data $I_{P1}$, $I_{P2}$ created under radiation exposure condition P1 and P2 respectively. Even though radiation exposure conditions are different, because of the shape of exposure field aperture is the same, outline of exposure field 501 of image data 510 and outline of exposure field 502 of image data 520 overlap with each other. However, since the radiation exposure conditions are different, reachable volume and reachable range of the scattered radiation in outer exposure field region differs.

Image data 530 is the difference image $D_{P1,P2}$ created from radiation image data 510 and 520. Since due to log transformation difference value of lower density region get emphasis, region with bigger absolute difference value spread as a glare in the outer exposure field region $I1_{P2}$. On the other hand, in the exposure field region $I2_{P2}$ compared to outer exposure field region the absolute difference value decrease rapidly, thus, the outline of exposure field can be easily extracted.

In the example process mentioned above, the equation 1 is used for calculating difference image created by scattered radiation, however, the following equation 2 and equation 3 may also be used for calculating the difference image created by scattered radiation. Whichever the function is used, the characteristic of the function is emphasizing the difference value in lower density region. In equation 2 emphasizing by division process and in equation 3 emphasizing by resetting to a constant value is conducted.

$$D_{P1,P2}(x, y) = \frac{I_{P1}(x, y)}{I_{P2}(x, y)} \qquad \text{(Equation 2)}$$

$$D_{P1,P2}(x, y) = A - B \qquad \text{(Equation 3)}$$
$$A = \begin{cases} 0 & I_{P1}(x, y) \geq T \\ I_{P1}(x, y) & I_{P1}(x, y) < T \end{cases}$$
$$B = \begin{cases} 0 & I_{P2}(x, y) \geq T \\ I_{P2}(x, y) & I_{P2}(x, y) < T \end{cases}$$

Here, in equation 3, T is a threshold value that separates lower density region and higher density region of the radiation image. Moreover, in equation 3 the value has been reset to 0, this value can be a value other than 0.

Next, each step is explained returning to FIG. 6. In step S604, image processing unit 108, based on the outline of exposure field E of difference image $D_{P1,P2}$ output by detecting unit 107, extracts the exposure field region $I2_{P2}$ from radiation $I_{P2}$. Specifically, absolute value of image density value $|D_{P1,P2}(x, y)|$ of each pixel (x, y) of difference image $D_{P1,P2}$ is compared with a predetermined threshold value Tedge, in case $|D_{P1,P2}(x, y)|>$Tedge is satisfied by the pixel (x, y) it is set as an outline element for exposure field. Here, the outline elements for exposure field form a field with certain width. As an example, in FIG. 5 the region 504 represents a field formed by the outline elements for exposure field. Due to the fact the absolute value of image density value $|D_{P1,P2}(x, y)|$ is changed rapidly around outline of exposure field, selecting a value for Tedge that makes the outline of exposure field correspond to the internal border of the field formed by the outline elements for exposure field can be easily conducted. The region surrounded by the filed formed by the pixels for exposure field is extracted as the exposure field region $I2_{P2}$.

In addition, in case the radiation exposure conditions are set to adequate value exposure field region $I2_{P1}$ is extracted from radiation image data $I_{P1}$.

At step S605, the image processing unit 108 calculates feature amounts based on image density value from the extracted exposure field region $I2_{P2}$. Here, feature amounts such as maximum image density value, minimum image density value, variance, and standard difference value are calculated. Based on calculated feature amounts the maximum and minimum luminance value for monitor display is calculated, and then after conducting tone conversation to radiation image data $I_{P2}$, it is output as an display image Iout.

In the final step S606, the image output unit 109 displays the display image Iout in a monitor.

Here, in present embodiment, it may also conduct the above processes to multiple radiation image data previously saved in to the storage unit 106 by selecting two images with different image conditions.

Here, each construction element of present embodiment in FIG. 1 is implemented with software, however it can be also be implemented with dedicated hardware. In this case, radiation imaging apparatus 100 in FIG. 1 is implemented with a computer such as a PC (personal computer) and WS (work station).

Figure 10:
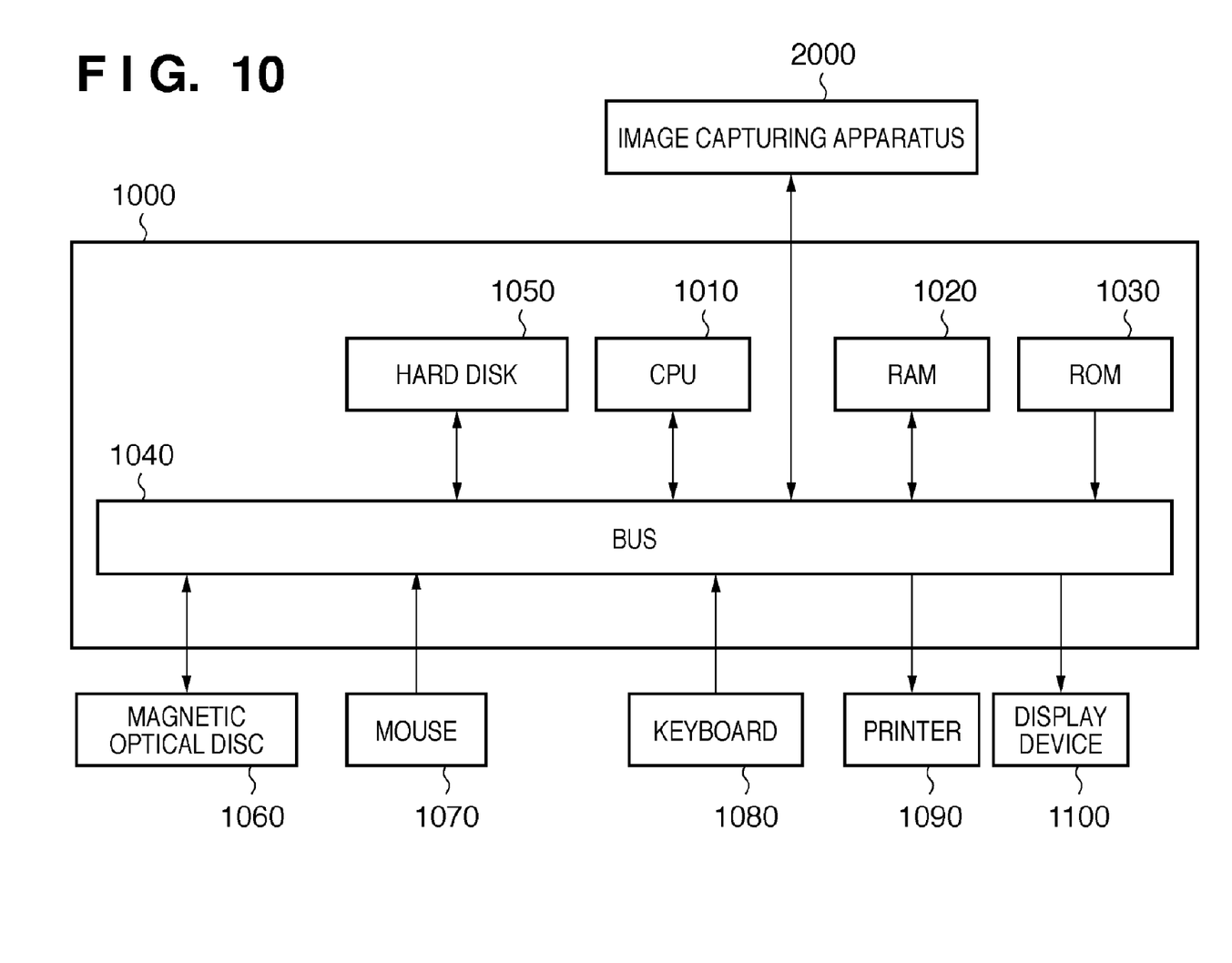
FIG. 10 is a figure showing an example of computer system construction that can implement current invention.

The FIG. 10 is an example that represents a block figure of possible implementation of the present embodiment using a computer system. As shown in the FIG. 10, computer 1000 is connected to image capturing apparatus 2000, and configured such that computer 1000 and image capturing apparatus 2000 can communicate data between each other. First computer 1000 is explained as follows.

Based on programs and data saved in RAM 1020 and ROM 1030 the CPU 1010 conducts the processes according to the image processing apparatus of present invention while conducting processes necessary for controlling the whole computer system.

RAM 1020 contains a memory area for temporarily storing programs uploaded from magnetic optical disk 1060, hard disk 1050 etc. In addition, RAM 1020 contains a memory area for temporarily storing radiation image data received from image capturing apparatus 2000. Moreover, RAM 1020 contains a memory area for CPU 1010 work memory area necessary for conducting each CPU 1010 processes.

ROM 1030 contains initial setting data, boot program etc for computer 1000.

Hard disk 1050, contains programs and data belong to OS (Operating System) and program and data necessary for running CPU 1010 processes for conducting each operation between construction elements as shown in FIG. 1. Then these programs and data get loaded, according to the CPU 1010 control routings, into the RAM 1020, and used for CPU 1010 processes. Also, the image data can also be saved into the hard disk 1050.

The magnetic optical disk 1060 is an example of a storage medium and program and data saved in hard disk 1050 can be saved partially or totally into the magnetic optical disk 1060.

Mouse 1070 and keyboard 1080 allow operating the computer 1000 and make possible to input instructions into the CPU 1010. As an example, radiation exposure conditions of the setting unit 102, as indicated in FIG. 1, are set using the mouse 1070 and keyboard 1080.

Printer 1090 is an example of an output terminal that the image output unit 109 is output to. Display device 1100 can be implemented with technologies such as CRT and liquid crystal technology and displays results according to CPU 1010 processes using text and images. As an example, when processes conducted by the elements in FIG. 1, the final image output from image processing unit 108 is displayed in the display unit 1100. Bus 1040 connects each of the units.

Next, image capturing apparatus 2000 is explained. Image capturing apparatus 2000, is a apparatus for image capturing similar to radiation fluoroscopy apparatus which captures and provides a radiation image to the computer 1000. In addition, radiation image data can be provided as a whole to the computer 1000 or can be provided one by one as they are captured. Moreover, the radiation exposure conditions of setting unit 102 of FIG. 1 and capturing commands are provided to the image capturing apparatus 2000 from the computer 1000.

As explained above, according to the present embodiment, precise outline of exposure field can be extracted relatively easily by evaluating the scattered radiation level fluctuation of two images with different exposure conditions. Moreover, based on tone transformation conducted using the feature amounts calculated from exposure field region, image processing such as extracting the exposure field region is possible.

The Second Embodiment

Figure 7:
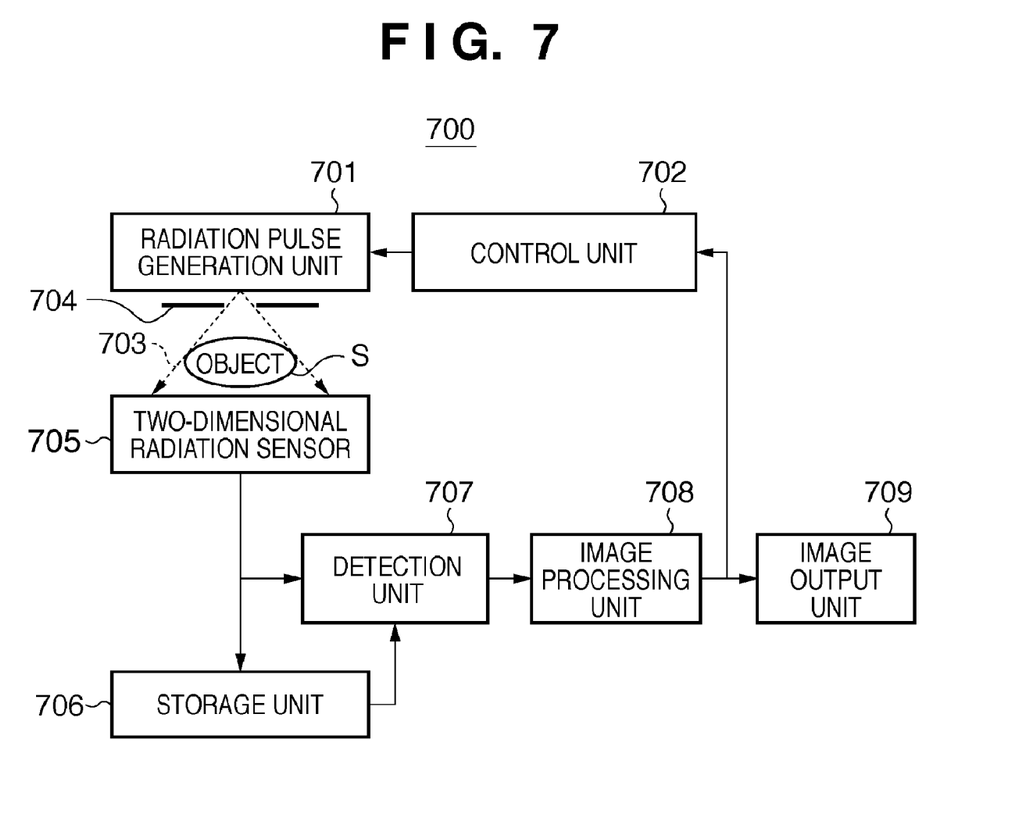
FIG. 7 is a block diagram showing an example of a system according to the second embodiment.

In the second embodiment, the present invention, as an example, is applied to a radiation fluoroscopy apparatus 700 as shown in FIG. 7. FIG. 7 is an example of system block diagram of second embodiment according to the present invention.

In the radiation fluoroscopy apparatus 700, according to the radiation exposure conditions set by the control unit 702 radiation pulse generation unit 701 generates radiation pulse 703 towards object S. Irradiation coverage of radiation pulse 703 is controlled in order to only allow radiation to pass through the region of interest of the object S using the exposure field aperture 704 installed into radiation-pulse generation unit 701. Two-dimensional radiation sensor 705 output the reached radiation pulse 703 as a radiation image data I.

In addition to previously mentioned elements, radiation fluoroscopy apparatus 700 comprise of storage unit 706 that saves image radiation data I output by two-dimensional radiation sensor 705, detection unit 707, image processing unit 708 and image output unit 709.

Detection unit 707 detects the scattered radiation fluctuation using multiple radiation image data. Image processing unit 708, based on the radiation image fluctuation detected, exposure field region I2 is extracted by clearing off the outer exposure field region I1 from radiation image data I. Next, image processing unit 708 calculates feature amount from extracted exposure field region I2 and output as control parameters needed at the control unit 702 to conduct tone transformation to radiation image data I to the control unit 702. Image output unit 709 displays image processing conducted radiation image data I in a monitor in real time.

Figure 8:
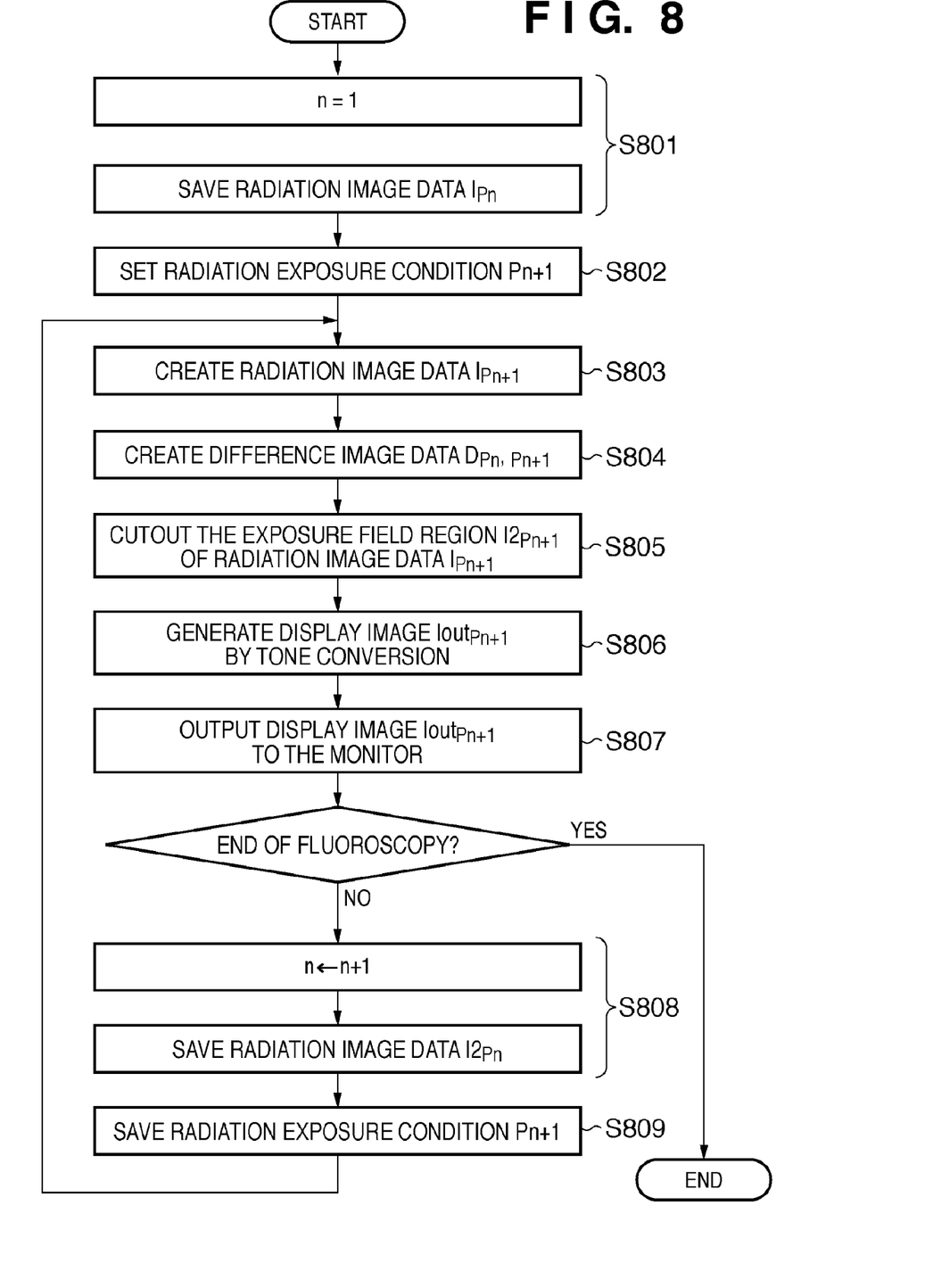
FIG. 8 is a flowchart showing an example of operations of image processing apparatus according to second embodiment.

The process flow according to the present embodiment is explained using the flowchart in FIG. 8 as follows. FIG. 8 is a flowchart showing an example of operation of image processing apparatus according to second embodiment. In addition, in the following explanation, the radiation exposure condition of n th frame is denoted as Pn, the radiation image data created with radiation exposure condition Pn is denoted as $I_{Pn}$.

In step S801, n is set to 1 (n=1). Then, according to the radiation exposure conditions Pn set by the control unit 702 radiation-pulse generation unit 701 generates radiation pulse 703 towards imaged object S. It is expected to have a low radiation exposure level of object S at radiation exposure condition P1. As ways of decreasing the radiation level, decreasing tube voltage, tube current or shorten the time duration of exposure can be given. The radiation pulse 703, directed to object S by exposure field aperture 704, pass though it while attenuating, and reach the two-dimensional radiation sensor 705. The two-dimensional radiation sensor 705 transform the received radiation pulse 703 to radiation image data $I_{Pn}$ and output to the storage unit 706 where it get saved.

In step S802, control unit 702 set a radiation exposure condition Pn+1 that is different from radiation exposure condition Pn. Radiation exposure condition P2 has been explained as a condition which creates adequate radiation exposure for creating radiation image of object information for diagnosis by controlling tube voltage, tube current and exposure time (according to the first embodiment of the present invention), however in present embodiment it is explained as a radiation exposure condition which has tube voltage higher than radiation exposure level Pn.

Then in step S803, the radiation-pulse generation unit 701 generates a radiation pulse 703 towards object S based on radiation exposure condition Pn+1 calculated by control unit 702. The radiation pulse 703, directed to object S by exposure field aperture 704, pass though it while attenuating, and reach the two-dimensional radiation sensor 705. The two-dimensional radiation sensor 705 transform the received radiation pulse 703 to radiation image data $I_{Pn+1}$ and output it.

In step S804, detection unit 707 detect the scattered radiation fluctuation between radiation image data $I_{Pn}$ and $I_{Pn+1}$. Similar to first embodiment of present invention, detection unit 707, as shown in equation 4, after conducting logarithmic transformation to radiation image data $I_{Pn}$ and $I_{Pn+1}$, difference between images is calculated and difference image $D_{Pn, Pn+1}$ is obtained.

$$D_{Pn,Pn+1}(x,y) = \log(I_{Pn}(x,y)) - \log(I_{Pn+1}(x,y)) \quad \text{(Equation 4)}$$

In above equation, $D_{Pn, Pn+1}(x/y)$, $I_{Pn}(x, y)$ and $I_{Pn+1}$ represents the image density value of coordinate (x, y) of difference data $D_{Pn, Pn+1}$, radiation image data $I_{Pn}$ and radiation image data $I_{Pn+1}$ respectively. In addition, the same coordinate system of FIG. 2 is used. The usage of log values allows emphasizing the difference in lower image density region.

In step S805, image processing unit 708, based on the outline of exposure field E of difference image output by detection unit 707, exposure field region $I2_{Pn+1}$ is extracted from radiation image data $I_{Pn+1}$. Specifically, absolute value of image density $|D_{Pn, Pn+1}(x, y)|$ of each pixel (x, y) of difference image $D_{Pn, Pn+1}$ is compared with a predetermined threshold value Tedge, in case $|D_{P1, P2}(x, y)| >$ Tedge is satisfied by the pixel (x, y), it is set as an outline element for exposure field. The region surrounded by the field created by the outline elements for exposure field is extracted as the exposure field region $I2_{Pn+1}$.

At step S806, image processing unit 708 feature amounts are calculated based on image density value from the extracted exposure field region $I2_{Pn+1}$. Here, feature amounts such as maximum image density value, minimum image density value, variance, and standard difference value are calculated. Based on calculated feature amounts the maximum and minimum luminance value for monitor display is calculated, and then after conducting tone conversation to radiation image data $I_{Pn+1}$, it is output as $Iout_{Pn+1}$.

In step S807, image output unit 709 displays the display image Iout$_{n+1}$ on the monitor. In case of continue viewing, advance to step S808, in case viewing is ended the process it concluded.

In step S808, n is increased by 1, and then exposure field region I2$_{Pn}$ is saved in storage unit 706.

In step S809, control unit 702 calculates the next radiation exposure condition Pn+1 using exposure-field region I2$_{Pn}$, and then passed the information to radiation-pulse generation unit 701. Specifically, control unit 702, first calculate the average value of radiation image data within the exposure field region I2$_{Pn}$. When the average value is bigger than a predetermined threshold value, the radiation exposure condition Pn+1 set in a way the radiation energy is reduced. When the average value is smaller than a predetermined threshold value, the radiation exposure condition Pn+1 set in a way the radiation energy is increased. Then return to step S803.

As explained above, according to the present embodiment, the radiation fluoroscopy unit can extract precise outline of exposure field relatively easily, by evaluating the scattered radiation level fluctuation of two image frames output one after the other. Moreover, based on tone transformation conducted using the feature amounts calculated from exposure field region, radiation exposure control is possible.

The Third Embodiment

The third embodiment according to the present invention applied to a radiation imaging apparatus 100 as shown in block diagram in FIG. 1 or radiation fluoroscopy apparatus 700 as shown in block diagram in FIG. 7 that can clear away the radiopaque object region from a radiation image.

Figure 9:
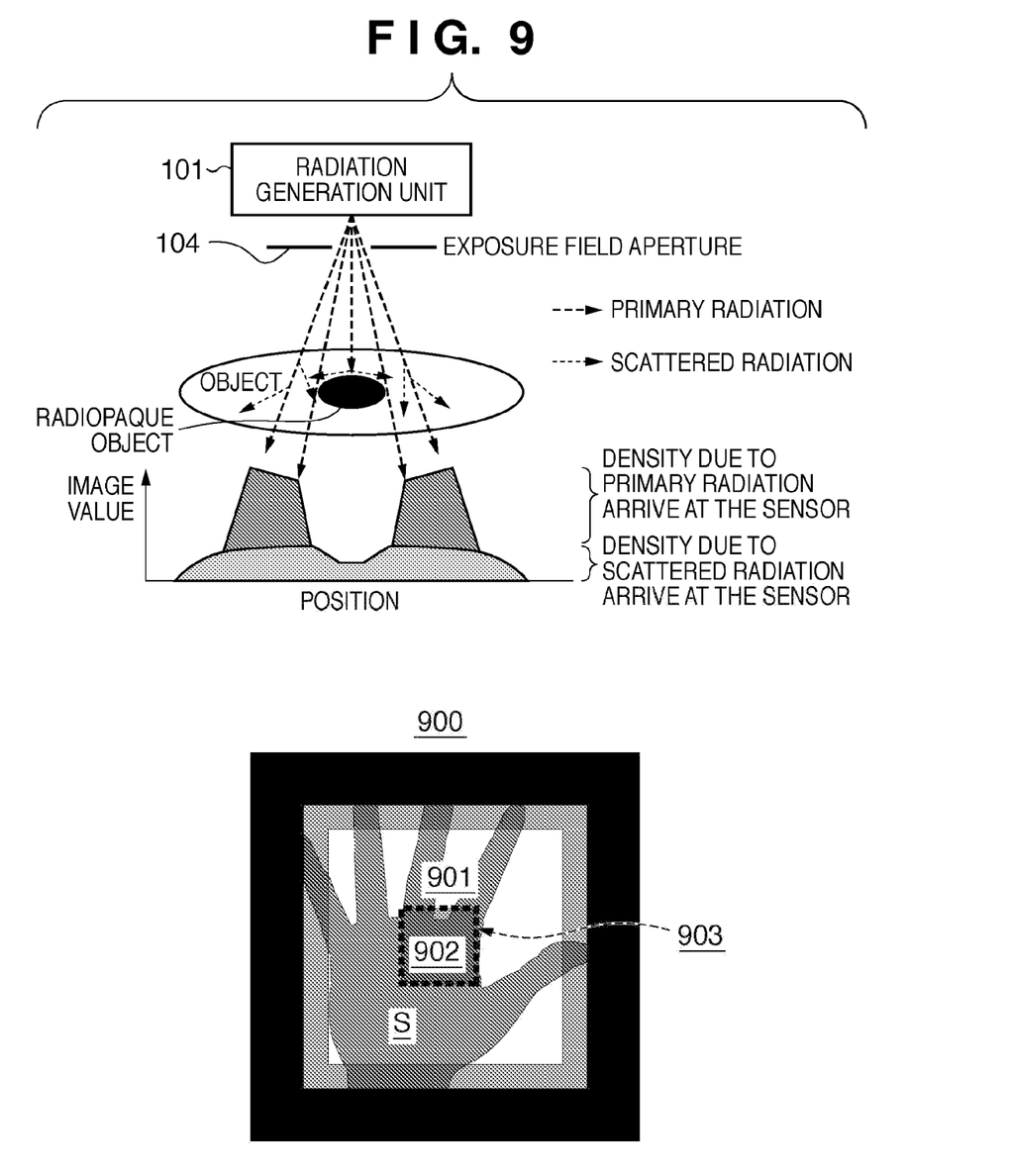
FIG. 9 is a view showing an example of an image that undergoes image processing according to present invention.

As shown in FIG. 9, in present embodiment, radiation image data 900 includes radiopaque object region 901 and object region 902. FIG. 9 is an example of radiation image undergoes processing according to present invention. The radiopaque object region 901, as a example when artificial dental root (implantation) is located inside the body while human body imaging, is the region created in the image due to highly different radiation transmission level of the radiopaque object. In general image density value of this region differ vastly compared to object region with diagnostic interest, and it does not have meaningful image information for the diagnosis. On the other hand, the object region 902 is the region with diagnostic interest in this example, and needed to conduct suitable image processing for increasing the visibility of X ray imaging apparatus. Thus, the image processing discussed in first embodiment and the second embodiment is applied to the radiation image data 900.

In present embodiment, similar processes as in previously mentioned embodiment are conducted; here it is only explained the summery base on first embodiment. First, the object S is exposed to two radiation beams with different radiation exposure conditions. After conducting logarithmic transformation to the obtained radiation image data, difference image processes are conducted to create the difference image D$_{P1, P2}$. At the outline of radiopaque object, similar to outline exposure field, a higher absolute value of image density value are expanded as a glare. Here, absolute value of image density value |D$_{P1, P2}$(x, y)| of each pixel (x, y) of difference image D$_{P1, P2}$ is compared with a predetermined threshold value Tedge, in case |D$_{P1, P2}$(x, y)|>Tedge is satisfied by the pixel (x, y), it is set as an outline element for radiopaque object. Due to the fact the absolute value of image density value |D$_{P1, P2}$(x, y)| is changed rapidly around outline of radiopaque object, selecting a value Tedge that makes the outline of radiopaque object correspond to the internal border of the field formed by the outline elements for radiopaque object can be easily conducted.

Thus, according to the above mentioned method, radiation imaging apparatus uses the fluctuation of scattered radiation level between two radiation images with different radiation exposure conditions for clearing off the radiopaque object region relatively easily and enable obtaining the feature amounts only from the object region with diagnostic interest. Also, based on the feature amounts, suitable tone processing is become possible.

Moreover the radiation fluoroscopy unit can relatively easily clearing away the radiopaque object region and obtain the feature amounts only from the object region with diagnostic interest, by evaluating the scattered radiation fluctuation between two continuous radiation image frames. Also, based on the feature amounts it is possible to conduct suitable tone processing and controlling of the radiation exposure conditions.

The Other Embodiment

The above-described exemplary embodiments of the present invention can also be achieved by providing a computer-readable storage medium that stores program code of software (computer program) which realizes the operations of the above-described exemplary embodiments, to a system or an apparatus. Further, the above-described exemplary embodiments can be achieved by program code (computer program) stored in a storage medium read and executed by a computer (CPU or micro-processing unit (MPU)) of a system or an apparatus.

The computer program realizes each step included in the flowcharts of the above-mentioned exemplary embodiments. Namely, the computer program is a program that corresponds to each processing unit of each step included in the flowcharts for causing a computer to function. In this case, the computer program itself read from a computer-readable storage medium realizes the operations of the above-described exemplary embodiments, and the storage medium storing the computer program constitutes the present invention.

Further, the storage medium which provides the computer program can be, for example, a floppy disk, a hard disk, a magnetic storage medium such as a magnetic tape, an optical/magneto-optical storage medium such as a magneto-optical disk (MO), a compact disc (CD), a digital versatile disc (DVD), a CD read-only memory (CD-ROM), a CD recordable (CD-R), a nonvolatile semiconductor memory, a ROM and so on.

Further, an OS or the like working on a computer can also perform a part or the whole of processes according to instructions of the computer program and realize functions of the above-described exemplary embodiments.

In the above-described exemplary embodiments, the CPU jointly executes each step in the flowchart with a memory, hard disk, a display device and so on. However, the present invention is not limited to the above configuration, and a dedicated electronic circuit can perform a part or the whole of processes in each step described in each flowchart in place of the CPU.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2008-002614, filed Jan. 9 2008, which is hereby incorporated by reference herein in its entirety.

What is claimed is:

1. An image processing apparatus comprising:
   a setting unit configured to set a radiation exposure condition;
   a radiation generation unit configured to generate a radiation beam according to the set radiation exposure condition;
   a two-dimensional radiation sensor configured to transform the reached radiation beam into a radiation image data and output the radiation image data;
   a storage unit configured to store the radiation image data;
   a detecting unit configured to detect a scattered radiation fluctuation in the reached radiation beam based on a comparison of two radiation image data with different radiation exposure condition, where the two radiation image data are selected within the plurality of radiation image data stored in the storage unit; and
   an image processing unit configured to extract an outline of a region of interest from the radiation image data based on said scattered radiation fluctuation detected by said detecting unit.

2. The apparatus according to claim 1, wherein said detection of scattered radiation fluctuation is conducted based on arithmetic operation that emphasizes difference between image density values of corresponding pixels of the two radiation image data, where the corresponding pixels are included in lower density image region of the radiation image data.

3. The apparatus according to claim 2, wherein said arithmetic operation is evaluating a difference between results of logarithmic transformation of image density values of said two radiation images.

4. The apparatus according to claim 2, wherein said arithmetic operation is division operation of image density values of said pixels.

5. The apparatus according to claim 2, wherein said arithmetic operation is calculating the difference between image density values of said pixels after resetting said image density values to a constant value in case it is higher than a threshold value.

6. The apparatus according to claim 1, wherein said two radiation image data are output one after the other by the two-dimensional radiation sensor.

7. The apparatus according to claim 1, wherein said region of interest is:
   the exposure field region of said radiation beam, or
   the region after clearing off the region corresponding to radiopaque object from the exposure field region, in case imaged object contains a radiopaque object.

8. The apparatus according to claim 1, further comprising an image output unit configured to output said region of interest from the radiation image data based on the extracted said outline of the region of interest.

9. The apparatus according to claim 8, wherein said image output unit conducts output transformations on the radiation image data based on the feature amounts calculated using the radiation image data.

10. An image processing method comprising the steps of:
    setting a radiation exposure condition by a setting unit;
    generating a radiation beam according to the set radiation exposure condition by a radiation generating unit;
    transforming the reached radiation beam into a radiation image data and outputting the radiation image data, by a two-dimensional sensor;
    storing the radiation image data on a storage unit;
    detecting, by a detecting unit, a scattered radiation fluctuation in the reached radiation beam based on a comparison of two radiation image data with different radiation exposure condition, where the two radiation image data are selected within the plurality of radiation image data stored in the storage unit; and
    extracting an outline of a region of interest from the radiation image data based on said scattered radiation fluctuation detected at said detecting,
    wherein said steps of setting, generating, transforming, storing, detecting and extracting are executed by a processor.

11. A non-transitory computer-readable storage medium for storing a computer program for making a computer function as an image processing apparatus according to claim 1.

* * * * *